(12) United States Patent
Steindorff et al.

(10) Patent No.: US 11,465,515 B2
(45) Date of Patent: Oct. 11, 2022

(54) VEHICLE COMPRISING AN ELECTRICITY SUPPLY SYSTEM

(71) Applicant: Alstom Transport Technologies, Saint-Ouen (FR)

(72) Inventors: Konrad Steindorff, Braunschweig (DE); Stefan Schrank, Einbeck (DE)

(73) Assignee: Alstom Transport Technologies, Saint-Ouen (FR)

( * ) Notice: Subject to any disclaimer, the term of this patent is extended or adjusted under 35 U.S.C. 154(b) by 270 days.

(21) Appl. No.: 15/720,449

(22) Filed: Sep. 29, 2017

(65) Prior Publication Data

US 2018/0093586 A1  Apr. 5, 2018

(30) Foreign Application Priority Data

Sep. 30, 2016  (EP) .................................. 16306286

(51) Int. Cl.
  *H01M 8/04537* (2016.01)
  *H01M 8/04082* (2016.01)
  (Continued)

(52) U.S. Cl.
  CPC ................. *B60L 50/72* (2019.02); *B60L 1/06* (2013.01); *B60L 58/33* (2019.02); *B60L 58/34* (2019.02);
  (Continued)

(58) Field of Classification Search
  CPC ............ B60H 1/00278; B60H 1/00428; B60H 1/00885; B60H 1/004; B60H 1/00321;
  (Continued)

(56) References Cited

U.S. PATENT DOCUMENTS 4,548,875 A * 10/1985 Lance ................... H01M 8/247
                                                                  429/434
6,110,612 A    8/2000 Walsh
          (Continued)

FOREIGN PATENT DOCUMENTS

DE      102012017194      *  5/2014   ............... B60K 6/32
DE      102012017194 A1 *  5/2014   ............... B60K 6/32
          (Continued)

OTHER PUBLICATIONS

European Search Report dated Jun. 23, 2017, issued in corresponding European Application No. 16306286.2.

*Primary Examiner* — Kaity V Chandler
(74) *Attorney, Agent, or Firm* — Troutman Pepper Hamilton Sanders LLP (57) ABSTRACT

The invention concerns a vehicle comprising an electricity production unit configured for generating an electrical current, a transformer unit and a fuel storage unit, the production unit comprising at least two fuel cell stacks and a single first electrical connection interface for transmitting the electrical current to the transformer unit. The production unit further comprises a single cooling circuit, an air supply circuit and a single gaseous hydrogen supply circuit for supplying gaseous hydrogen, from the fuel storage unit, to each fuel cell stack. The production unit is separate from the fuel storage unit and connected to the fuel storage unit by a single connection interface, the production unit being removable from the vehicle as an integrated unit independently from the fuel storage unit.

11 Claims, 2 Drawing Sheets

(51) Int. Cl.
*H01M 8/2475* (2016.01)
*H01M 8/04029* (2016.01)
*B60L 50/72* (2019.01)
*B60L 1/06* (2006.01)
*B60L 58/34* (2019.01)
*H01M 8/04119* (2016.01)
*H01M 8/04007* (2016.01)
*B60L 58/33* (2019.01)
*B60K 1/04* (2019.01)
*H01M 8/249* (2016.01)

(52) U.S. Cl.
CPC ... *H01M 8/04007* (2013.01); *H01M 8/04029* (2013.01); *H01M 8/04164* (2013.01); *H01M 8/04201* (2013.01); *H01M 8/04619* (2013.01); *H01M 8/2475* (2013.01); *B60K 2001/0455* (2013.01); *B60L 2200/26* (2013.01); *B60L 2240/34* (2013.01); *B60L 2240/36* (2013.01); *H01M 8/249* (2013.01); *H01M 2250/20* (2013.01); *H01M 2250/405* (2013.01); *Y02B 90/10* (2013.01); *Y02P 70/50* (2015.11); *Y02T 90/40* (2013.01)

(58) Field of Classification Search
CPC .............. B60H 1/00899; B60H 1/3208; B60H 2001/3272; B60H 1/00064; B60H 2001/3238; B60H 2001/3261; B60H 1/00021; B60H 1/00378; B60H 1/00485; B60H 1/00807; B60H 1/3207; B60H 1/321; B60H 1/3222; B60H 2001/00307; B60H 2001/00928; B60H 2001/00942; B60H 2001/00949; B60H 2001/325; B60H 2001/3283; B60H 2001/3292; B60H 1/00571; B60H 1/3205; B60H 1/3213; B60H 1/00564; B60H 1/2215; B60H 1/2221; B60H 2001/00957; B60H 2001/2228; B60H 2001/2271; B60H 2001/3285; B60H 1/00328; B60H 1/00342; B60H 1/00385; B60H 1/00921; B60H 1/034; B60H 1/06; B60H 1/143; B60H 1/32; B60H 1/3201; B60L 58/26; B60L 2240/545; B60L 58/27; B60L 50/66; B60L 53/14; B60L 53/665; B60L 58/12; B60L 11/1848; B60L 1/003; B60L 1/02; B60L 1/06; B60L 2200/18; B60L 2230/12; B60L 2230/22; B60L 2240/34; B60L 2240/485; B60L 2240/525; B60L 2240/526; B60L 2240/527; B60L 2240/62; B60L 2240/80; B60L 2250/16; B60L 3/003; B60L 3/0046; B60L 3/12; B60L 50/62; B60L 53/00; B60L 53/11; B60L 53/16; H01M 2220/20; H01M 10/613; H01M 2/1077; H01M 10/625; H01M 2250/20; H01M 10/6556; H01M 10/653; H01M 10/6554; H01M 10/6567; H01M 10/66; H01M 2/1083; H01M 2/1094; H01M 2/12; H01M 2/206; H01M 2/348; H01M 8/04201; H01M 8/04303; H01M 8/04761; H01M 8/10; H01M 8/2465; H01M 10/655; H01M 10/6566; H01M 10/6568; H01M 10/659

See application file for complete search history.

(56) References Cited

U.S. PATENT DOCUMENTS

| | | | |
|---|---|---|---|
| 7,534,521 B2 * | 5/2009 | Hu | H01M 8/0247 429/434 |
| 2003/0070850 A1 * | 4/2003 | Reid | H01M 10/6563 180/68.5 |
| 2004/0108150 A1 * | 6/2004 | Guidry | B62D 33/02 180/65.31 |
| 2005/0233180 A1 | 10/2005 | DeSorbo | |
| 2006/0029856 A1 | 2/2006 | Vail et al. | |
| 2006/0152085 A1 | 7/2006 | Flett et al. | |
| 2006/0210841 A1 | 9/2006 | Wallace et al. | |
| 2009/0305087 A1 | 12/2009 | Rajashekara et al. | |
| 2010/0167097 A1 | 7/2010 | Heo et al. | |
| 2010/0304228 A1 * | 12/2010 | Majarov | H01M 8/04067 429/408 |
| 2010/0307636 A1 * | 12/2010 | Uemura | F17C 5/06 141/4 |
| 2011/0250514 A1 * | 10/2011 | Ramaswamy | H01M 8/04164 429/414 |
| 2013/0059221 A1 | 3/2013 | Katano | |
| 2014/0057184 A1 * | 2/2014 | Pillai | H01M 8/0662 429/410 |
| 2014/0335434 A1 | 11/2014 | Ikeya et al. | |
| 2015/0270565 A1 * | 9/2015 | Song | H01M 8/04225 165/80.4 |
| 2016/0072146 A1 | 3/2016 | Sridhar et al. | |
| 2016/0129796 A1 * | 5/2016 | Tomura | B60W 20/00 903/906 |
| 2017/0106724 A1 * | 4/2017 | Porras | H01M 10/6568 |

FOREIGN PATENT DOCUMENTS

| | | | | |
|---|---|---|---|---|
| JP | 2009173177 A | * | 8/2009 | H01M 8/00 |
| WO | WO-2013149712 A2 | * | 10/2013 | B60L 11/1898 |

* cited by examiner

VEHICLE COMPRISING AN ELECTRICITY SUPPLY SYSTEM

CROSS-REFERENCE TO RELATED APPLICATIONS

This application is based upon and claims the benefit of priority of the prior European Patent Application No. EP 16306286.2, filed on Sep. 30, 2016, the entire contents of which are incorporated herein by reference.

FIELD OF THE INVENTION

The present invention concerns a vehicle comprising an electricity supply system.

BACKGROUND

Most vehicles use onboard electricity supply systems for powering systems such as lighting, air conditioning or electronic components. In most personal vehicles, the electricity supply system comprises at least one battery charged by an alternator driven by the motor.

However, in more complex and electricity-consuming vehicle, dedicated electricity-producing systems are used. For example, some vehicles, for example railway vehicles, comprise a dedicated diesel motor for the sole purpose of driving an electricity-producing alternator. The electricity then produced is, for example, used to charge battery packs producing a current for driving an electric motor of the vehicle. This electricity supply system is therefore useful when an external electricity source, such as an overhead power line, is faulty or unavailable, or for providing additional energy when climbing steep slopes.

Since diesel motors produce greenhouse gases and particle-charged exhaust gases, such electricity systems are sometimes replaced by gaseous hydrogen-fueled systems using fuel cell stacks. However, fuel cell electricity supply systems of this kind require multiple additional modules for cooling or heating the fuel cell stacks, power electronics for adapting the current to the load, as well as dedicated supply modules for supplying gaseous hydrogen and oxygen.

Fuel cell-powered electricity-supplying systems are therefore complex and difficult to maintain. When a component of the electricity supply system is faulty the vehicle is therefore likely to be unavailable for service for a long time.

SUMMARY

One aim of the invention is to provide a vehicle, comprising an electric supply system, with improved availability.

To this end, the invention concerns a vehicle including an electricity supply system, the electricity supply system including an electricity production unit configured for generating a first electrical current having a first voltage, a transformer unit and a fuel storage unit for storing gaseous hydrogen, the production unit including at least two fuel cell stacks and including a single first electrical connection interface for transmitting the first electrical current to the transformer unit, the production unit including a single common cooling circuit filled with a first fluid for cooling each fuel cell stack, a common air supply circuit for supplying air to each fuel cell stack and a single common gaseous hydrogen supply circuit for supplying gaseous hydrogen, from the fuel storage unit, to each fuel cell stack and in that the production unit is separate from the fuel storage unit and connected to the fuel storage unit by a single connection interface, the production unit being removable from the vehicle as an integrated unit independently from the fuel storage unit.

Thanks to the invention, a faulty electricity production unit may be readily removed from the vehicle and replaced by a functional one. The vehicle may therefore quickly be brought back in service while the faulty electricity production unit is being repaired.

According to other advantageous aspects of the invention, the vehicle comprises one or several of the following features, taken individually or according to all the technically possible combinations:

- the vehicle comprises a fluid circulation circuit filled with a second fluid, the fluid circulation circuit being fluidically independent from the cooling circuit and including a first thermal exchanger configured for exchanging heat between the first fluid and the second fluid, the production unit further including a separable interface for transmitting second fluid between the first thermal exchanger and the fluid circulation circuit.
- the fluid circulation circuit is configured to heat a passenger compartment of the vehicle.
- the cooling circuit further comprises a second thermal exchanger for exchanging heat between the first fluid and air.
- the production unit comprises a common exhaust circuit for collecting exhaust gases of each fuel cell stacks, the exhaust circuit including a water condenser for extracting liquid water from the exhaust gases.
- the production unit comprises a single common heater configured for heating all fuel stacks.
- the transformer unit is configured for generating, from the first current, at least a second voltage different from the first voltage and a third voltage different from the second voltage and the first voltage, the second voltage causing a second current to flow and the third voltage causing a third current to flow, the production unit being removable from the electric vehicle independently from the transformer unit and including a second electrical connection interface for transmitting the second current from the transformer unit to the production unit and a third electrical connection interface for transmitting the third current from the transformer unit to the production unit.
- the second current is an AC current for driving at least the cooling circuit and the third current is a DC current.
- the vehicle is an electrical vehicle including an electrical motor, the electricity supply system further including at least an electrical accumulator configured for generating a driving electrical current for driving the motor, the transformer unit being configured for generating, from the first current, a charging electrical current for charging the accumulator.
- the cooling circuit comprises a fluid circulator for circulating the first fluid and each fuel cell stack comprises a commuting device for electrically connecting the fuel cell stack to the first electrical interface, the production unit further including a controller unit for controlling the fluid circulator and each commuting device.

BRIEF DESCRIPTION OF THE DRAWINGS

The invention will now be explained, as an illustrative example and without restraining the object of the invention, in correspondence with the associated Figures in which.

DETAILED DESCRIPTION

Figure 1:
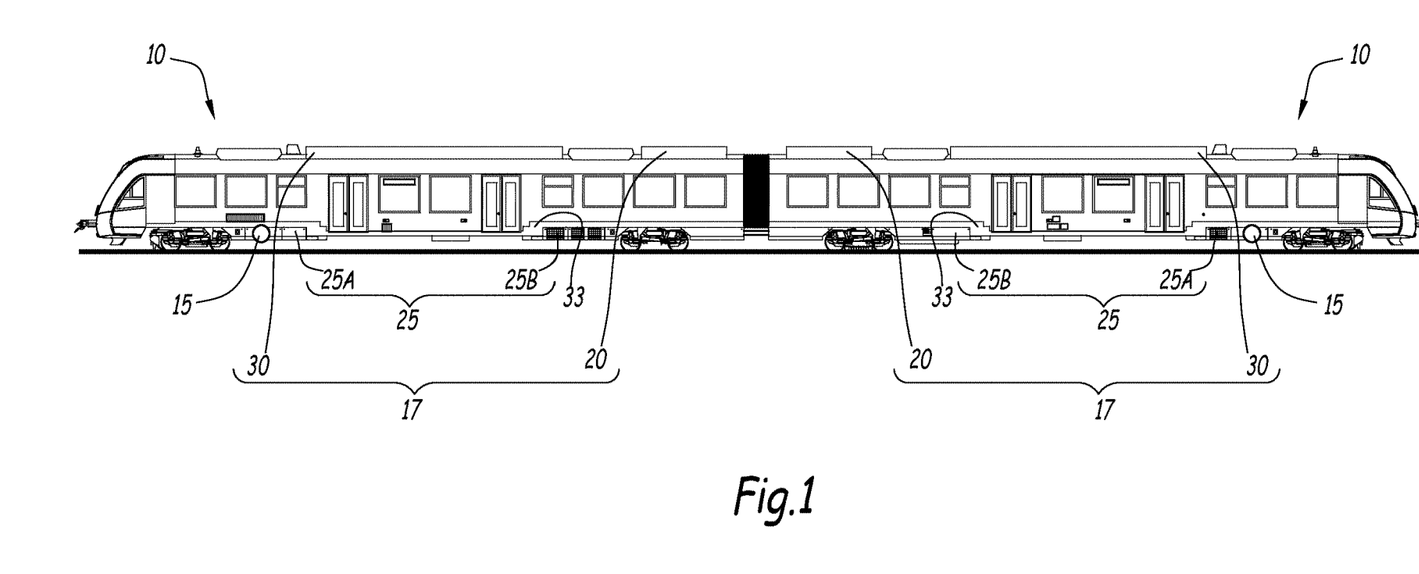
FIG. 1 is a schematic side view of a railway vehicle including an electricity production unit.

The vehicle 10 represented on FIG. 1 is a railway vehicle. For example, the vehicle 10 is a motor carriage of a train. According to the embodiment represented on FIG. 1, the vehicle 10 is one of two motor cars of a train.

The vehicle 10 is an electric vehicle driven by an electric motor.

The vehicle 10 comprises an electric motor 15, an electricity supply system 17, and a fluid circulation circuit 18.

The motor 15 is an electrical motor configured to move the vehicle 10 when the electrical motor 15 is supplied with a driving electric current. The motor 15 is configured for propelling a motor bogie of the vehicle 10.

The electricity supply system 17 is configured for generating a driving electric current for driving the motor 15 and for transmitting the driving current to the motor 15.

The electricity supply system 17 comprises an electricity production unit 20, a transformer unit 25, a fuel storage unit 30 and an electrical accumulator 33.

Figure 2:
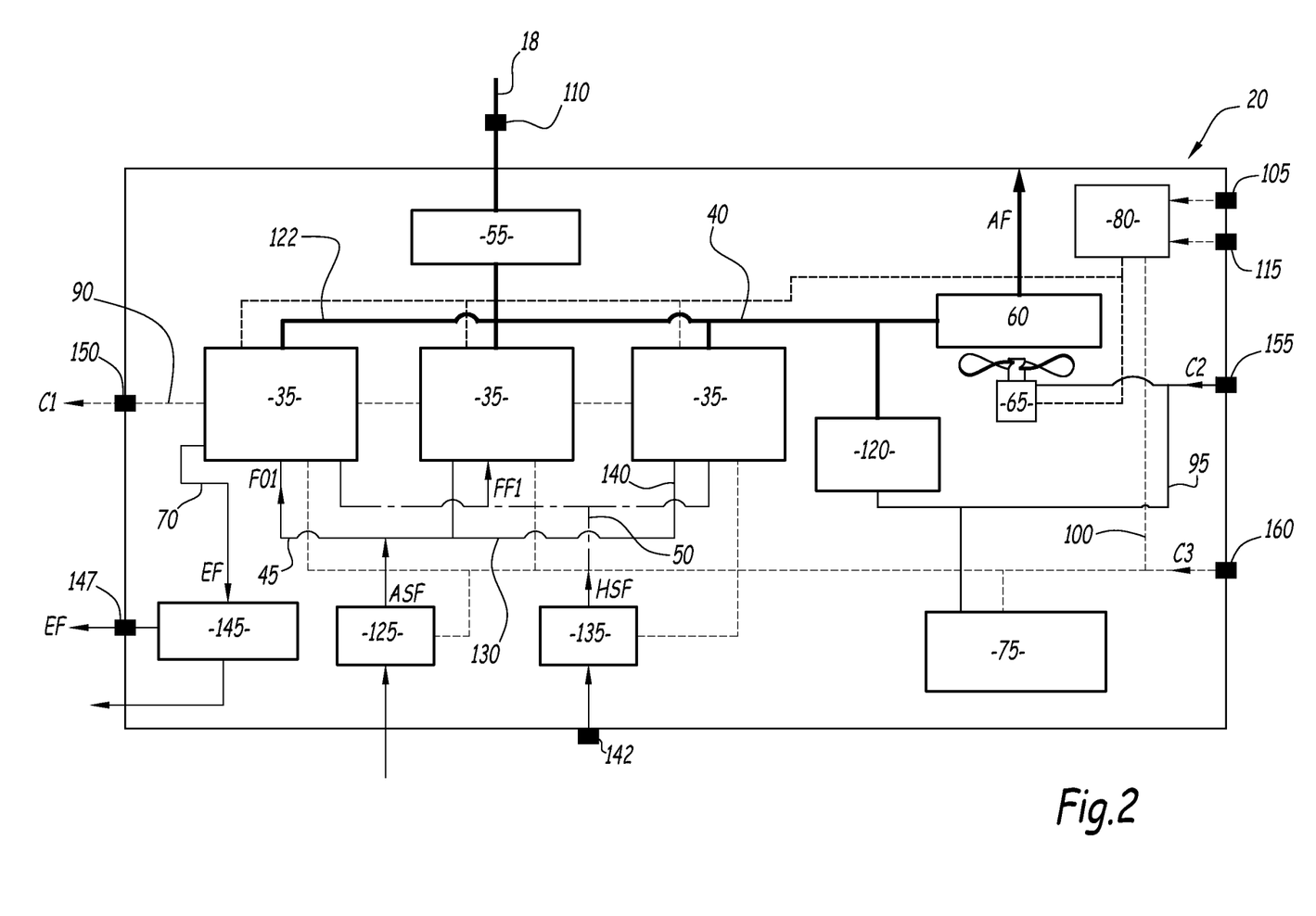
FIG. 2 is a scheme of the electricity production unit of the vehicle of FIG. 1.

The electricity production unit 20, also called a fuel cell power pack, is configured for generating a first electrical current C1. The first electrical current C1 is a DC current. A first voltage V1 is generated by the electricity production unit 20 in order to generate the first electrical current C1. The first voltage V1 is comprised between 200 volts (V) and 500 V, preferably between 240 V and 420 V. The electricity production unit 20 is not configured for driving the motor 15. In particular, the driving current C1 is not sufficient for driving the motor 15.

The electricity production unit 20 is separate from the fuel storage unit 30, from the electrical accumulator 33 and from the transfer unit 25.

The electricity production unit 20 is removable from the vehicle 10. The electricity production unit 20 is removable from the vehicle 10 independently from the fuel storage unit 30. In other words, the electricity production unit 20 is configured to be removed from the vehicle 10 while the fuel storage unit 30 remains secured to the vehicle 10.

The electricity production unit 20 is removable from the electrical vehicle 10 independently from the transfer unit 25. Furthermore, the electricity production unit is removable from the vehicle 10 independently from the electrical accumulator 33.

The electricity production unit 20 is removable as a unit from the vehicle 10. Preferably, the electricity production unit 20 is configured to be secured to a single tool, such as crane, and removed from the vehicle 10 by the tool in a single operation. All the elements comprised in the electricity production unit 20 are configured to be removed by the single tool in a single operation. Subsequently, the relative movement of each of the elements comprised in the electricity production unit 20, with respect to the electrical vehicle, is identical and simultaneous to the movement of each other element comprised in the electricity production unit 20.

The electricity production unit 20 comprises at least two fuel cell stack units 35, a single cooling circuit 40, an air supply circuit 45, a single gaseous hydrogen supply circuit 50, a first thermal exchanger 55, a second thermal exchanger 60, a fan 65, an exhaust circuit 70, a single heater 75, a controller unit 80, a casing 85, a single first electrical circuit 90, a single second electrical circuit 95, a single third electrical circuit 100, a first common interface 105, a fluid interface 110 and a second common interface 115.

The relative movement of any one element comprised in the ensemble formed by the fuel cell stacks 35, the first electrical connection interface 150, the common cooling circuit 40, the common air supply circuit 45 and the common gaseous supply circuit 50, with respect to the electrical vehicle 10, is identical and simultaneous to the movement of each other element 35, 150, 40, 45, 50 comprised in this ensemble.

For example, the relative movement of the vehicle 10 and of any one element comprised in the ensemble formed by items 35, 40, 45, 50, 55, 60, 65, 70, 75, 80, 85, 90, 95, 100, 105, 110 115 is identical and simultaneous to the relative movement of the vehicle 10 and any other element of that ensemble.

The electricity production unit 20 is, for example, releasably secured to a roof of the vehicle 10. The electricity production unit 20 is, preferably, secured above and supported by the roof. The electricity production unit 20 is, for example, mounted on two C-rails, which are part of the roof. The fixation between the C-rail and the electricity production unit 20 is done via a bracket-screw link.

Each fuel cell stack unit 35 is configured for receiving a first gaseous oxygen flow FO1 from the air supply circuit 45 and a first fuel flow FF1 from the gaseous hydrogen circuit 50, for generating a stack current SC and for transmitting the stack current SC to the first electrical circuit 90.

When generating the stack current SC, each fuel cell stack unit 35 generates an exhaust flow EF. The exhaust flow EF comprises at least one exhaust gas. At least one exhaust gas is a water vapor. Other exhaust gases may include nitrogen, oxygen, argon and other ambient air ingredients.

Each fuel cell stack unit 35 comprises a fuel cell stack, a commuting device and an air humidifier.

Each fuel cell stack is configured for generating the corresponding stack current SC when the fuel cell stack is supplied with the first gaseous oxygen flow FO1 and the first fuel flow FF1. Each fuel cell is, for example, a proton exchange membrane (PEM) fuel cell. Proton exchange membrane fuel cells, are also known as polymer electrolyte membrane (PEM) fuel cells.

The air humidifier is configured for injecting, in the first gaseous oxygen flow FO1, a flow of water vapor. Preferably, the air humidifier is configured for keeping a water vapor ratio in the first gaseous oxygen flow FO1 within a predefined range.

Each commuting device is configured for receiving from the fuel cell stacks the stack current for transmitting the stack current to the first electrical circuit 90.

Each commuting device is further configured for preventing the transmission of the stack current between the fuel cell stack and the first electrical circuit 90 upon reception of a breaking message from the controller unit 80.

The cooling circuit 40 is common to all fuel cell stack units 35. Only one cooling circuit 40 is therefore comprised in the electricity production unit 20.

The cooling circuit 40 is configured for cooling all fuel cell stack units 35. More precisely, the cooling circuit 40 is configured for cooling each fuel cell stack of each fuel cell stack unit 35.

The cooling circuit 40 is filled with a first fluid. The first fluid is a liquid. Preferably, the first fluid is deionized water.

In another embodiment, the first fluid is a mixture of glycol and deionized water.

The cooling circuit 40 comprises a circulator 120 and fluid ducts 122.

The cooling circuit 40 further comprises the first thermal exchanger 55 and the second thermal exchanger 60. This means that the cooling circuit 40 is configured in such a manner that the first fluid exchanges heat with the first thermal exchanger 55 and subsequently with the second thermal exchanger 60. In other words, each of the first thermal exchanger 55 and the second thermal exchanger 60 is at least partially filled with the first fluid.

The first fluid circulates through the cooling circuit 40. Preferably, the cooling circuit 40 is a closed circuit. In other words, when the first fluid circulates through the cooling circuit 40, the first fluid circulates in a closed loop.

The circulator 120 is configured for moving the first fluid through the cooling circuit 40. The circulator 120 is configured for generating a cooling flow CF of the first fluid in the cooling circuit 40. The cooling flow CF has a first flow rate FR1. The circulator 120 is configured for modifying the first flow rate FR1 upon receiving a command from the controller unit 80.

The circulator 120 is, for example, an electrical circulator including at least one pump. The circulator 120 is electrically connected to the second electrical circuit 95.

Each of the fluid ducts 122 is configured for guiding the first fluid between the circulator 120, the first thermal exchanger 55, the second thermal exchanger 60 and each of the fuel cell stack units 35.

The air supply circuit 45 is configured for supplying each fuel cell stack unit with the corresponding first oxygen flow FO1.

The air supply circuit 45 is common to all fuel cell stack units 35. In another embodiment, the air supply circuit 45 is common to a subset of fuel cell stacks 35. As a variant, one air supply circuit 45 is dedicated to each of the fuel cell stacks 35.

The air supply circuit 45 comprises at least one air supply unit 125 and air supply ducts 130. For example, the air supply circuit 45 comprises only one air supply unit 125. In another embodiment, the air supply circuit 45 comprises a plurality of air supply units 125.

The air supply unit 125 is configured for generating an air supply flow ASF and for transmitting the air supply flow ASF to the air supply ducts 130. The air supply unit 125 comprises, for example, an electrical compressor for generating the air supply flow. The air supply unit 125 is configured for seeking in outside air and for generating the air supply flow ASF from the outside air.

The air supply unit 125 is configured for filtering the outside air in order to remove solid particles from the air supply flow.

The air supply flow has a second flow rate FR2. The air supply flow rate is variable. For example, the air supply unit 125 is configured for modifying the air supply flow rate upon reception of a specific command from the control unit 80.

The air supply ducts 130 are configured for receiving the air supply flow ASF from the air supply unit 125 and for generating, from the air supply flow ASF, all first gaseous oxygen flows FO1. For example, the air supply ducts 130 are configured for dividing the air supply flow ASF into the first gaseous oxygen flows FO1.

In another embodiment, a separate air supply unit 125 is provided for each fuel cell stack unit 35 and supplies the corresponding fuel cell stack unit 35 with a corresponding air supply flow ASF.

The gaseous hydrogen supply circuit 50 is configured for supplying each fuel cell stack unit 35 with the corresponding first fuel flow FF1.

The gaseous hydrogen supply circuit 50 is common to all fuel cell stack units 35. Therefore, the electricity production unit 35 comprises only one gaseous hydrogen supply circuit 50.

The gaseous hydrogen supply circuit 50 comprises a hydrogen supply unit 135, hydrogen supply ducts 140 and a fuel interface 142.

The hydrogen supply unit 135 is configured for generating a hydrogen supply flow HSF and for transmitting the hydrogen supply flow to the hydrogen duct 140. The hydrogen supply flow HSF comprises at least gaseous hydrogen. The hydrogen supply flow HSF has a third flow rate FR3.

The hydrogen supply unit 135 is connected to the fuel storage unit 30 through the fuel interface 142.

The hydrogen supply unit 135 is configured for sucking in gaseous hydrogen from the fuel storage unit 30 through the fuel interface 142 and for generating, from the gaseous hydrogen, the hydrogen supply flow HSF.

The hydrogen supply unit 135 is configured for filtering the gaseous hydrogen provided by the fuel storage unit 30 in order to ensure purity of the hydrogen supply flow HSF.

The hydrogen supply unit 135 is further configured for monitoring a pressure and/or a temperature of the gaseous hydrogen circulating in the air supply ducts 140 and/or in the fuel storage unit 30, and for shutting the fuel interface 142 if an overpressure is detected.

The hydrogen supply ducts 140 are configured for receiving, from the hydrogen supply unit 135, the hydrogen supply flow HSF, for generating from the hydrogen supply flow HSF all first fuel flows FF1 and for transmitting each first fuel flow FF1 to the corresponding fuel cell stack unit 35.

The fuel interface 142 is configured for connecting the hydrogen supply unit 135 to the fuel storage unit 30. The fuel interface 142 is the only interface connecting the production unit 20 and the fuel storage unit 30. Therefore, all gaseous hydrogen circulating between the fuels storage unit 30 and the electricity production unit 20 pass through the fuel interface 142.

The fuel interface 142 is a separable connection interface. This means that the fuel interface 142 is configured to be disconnected from the fuel storage unit 30 in order to allow relative movement between the electricity production unit 20 and the fuel storage unit 30.

The first thermal exchanger 55 is configured for exchanging heat between the fluid circulation circuit 18 and the cooling circuit 40. More precisely, the first thermal exchanger 55 is configured for exchanging heat between the first fluid filling the cooling circuit 40 and a second fluid filling the fluid circulation circuit 18.

The first thermal exchanger 55 is a liquid to liquid exchanger. For example, the first thermal exchanger 55 is a plate exchanger.

The fluid interface 110 is configured for fluidically connecting the first thermal exchanger 55 and the fluid circulation circuit 18. For example, the fluid interface 110 is configured for transmitting the second fluid between the first thermal exchanger 55 and the fluid circulation circuit 18.

The fluid interface 110 is a separable interface. The fluid interface 110 is, for example, connected to a corresponding connector of the fluid circulation circuit 18.

The second thermal exchanger 60 is configured for exchanging heat between the cooling circuit 40 and the outside atmosphere. More precisely, the second thermal exchanger 60 is configured for exchanging heat between the first fluid and air. For example, the second thermal exchanger 60 comprises a radiator and one or more cooler fans 65. Each fan 65 is configured for generating an air flow AF and for directing the air flow AF onto the second thermal exchanger 60. The air flow AF has a fourth flow rate FR4. Each fan 65 is, therefore, able to modify the fourth flow rate FR4.

The exhaust circuit 70 is common to all fuel cell stack units 35. In another embodiment, the exhaust circuit 70 is common to a subset of fuel cell stack units 35. The exhaust circuit 70 is configured for collecting each exhaust flow EF from each fuel cell stack unit 35 to which it is common.

The exhaust circuit 70 comprises a water condenser 145 and an exhaust outlet 147. The exhaust circuit 70 is configured for transmitting each exhaust flow from the corresponding fuel cell stack unit 35 to the exhaust outlet 147.

The exhaust outlet 147 is, for example, secured to the casing 85.

The exhaust outlet is, for example, an opening in the top of the casing 85, where the exhaust circuit 70 is guided to.

The water condenser 145 is configured for extracting water from the exhaust flow EF. The water condenser 145 is, preferably, configured for generating, from the exhaust gases forming each exhaust flow EF, liquid water. The water condenser 145 is, for example, configured for transmitting the extracted water to each air humidifier.

The heater 75 is configured for heating each fuel cell stack. The heater 75 comprises for example, a heating resistor for each fuel cell stack unit 35.

The controller unit 80 is electrically connected to each fuel cell stack unit 35, to the circulator 120 and to the fan 65.

The controller unit 80 is configured for controlling each commuting device. For example, the controller unit 80 is configured for generating commuting messages for changing each commuting device between an "off" state where the commuting device prevents the corresponding stack current SC from reaching the first electrical circuit 90 and an "on" state where the commuting device transmits the corresponding stack current SC to the first electrical circuit 90.

The controller unit 80 is, further, configured for generating a fan message for commanding the fan 65 to modify the fourth flow rate FR4.

The controller unit 80 is electrically connected to the first command interface 105 and to the second command interface 115.

The first command interface 105 is a bus communication interface. For example, Controller Area Network (CAN) based protocols, the Multifunction Vehicle Bus (MVB), ISOBUS or Ethernet protocol can be used. The first command interface 105 is therefore configured to allow the controller unit 80 to communicate with a central controlling unit of the vehicle 10.

Via the bus communication interface 105 enhanced control to use the full functionality of the electricity production unit 20 is possible. Moreover, diagnostic messages from the electricity production unit 20 can be transmitted to a vehicle diagnostic system of the central controlling unit.

The second command interface 115 is configured for receiving and transmitting binary signals via hardwired logic. The second command interface 115 is configured to exchange safety relevant data and other necessary information when the central vehicle controlling unit is not available to assure basic functionality of the electricity production unit 20.

The casing 85 is configured for isolating all fuel cell stack units 35, the controller unit 80, the circulator 120, and the feeder 75 from the outside of the casing 85.

The casing 85 supports each connection interface 105, 110, 115, 142, 150.

For example, the casing 85 comprises an ensemble of panels enclosing a chamber receiving all fuel cell stack units 35, the controller unit 80, the circulator 120, and the feeder 75. Each panel is, for example, at least partially made of a synthetic material such as a plastic material. In another embodiment, each panel is at least partially made of a metal such as steel.

The casing 85 comprises a frame supporting each fuel cell stack unit 35, the cooling circuit 40, the air supply circuit 45, the gaseous hydrogen supply circuit 50, both thermal exchangers 55, 60, the fan 65, the exhaust circuit 70, the heater 75 and the controller unit 80. Each of the fuel cell stack units 35, the cooling circuit 40, the air supply circuit 45, the gaseous hydrogen supply circuit 50, both thermal exchangers 55, 60, the fan 65, the exhaust circuit 70, the heater 75, and the controller unit 80 is secured to the frame.

The frame is, for example, formed by welding several shaped profiles, for example U-, L-, I- or C-shaped profiles. In another embodiment, the shaped profiles are bolted or glued together.

None of the transformer unit 25, the fuel storage unit 30 and the electrical accumulator 33 is secured to the casing 85.

The first electrical circuit 90 is configured for electrically connecting all fuel cell stack units 35 together. The first electrical circuit 90 comprises a first electrical connection interface 150. The first electrical connection interface 150 is configured for electrically connecting the first electrical circuit 90 to the transformer unit 25.

The first electrical connection interface 150 is a separable interface. For example, the first electrical connection interface 150 is detachably connected to a corresponding connector of the transformer unit 25.

The first electrical circuit 90 is configured for receiving, from each fuel cell stack unit 35 the corresponding stack current ST, for forming, from each stack current SC the first electrical current C1 and for transmitting the first electrical current C1 to the first electrical connection interface 150.

The first electrical circuit 90 is, for example, a serial circuit. This means that all fuel cell stack units 35 are connected in series to the first electrical circuit 90.

In another embodiment, the first electrical circuit 90 is a parallel circuit, in which at least two fuel cell stack units are connected in parallel from each other. For example, the first electrical circuit 90 comprises at least two fuel cell stack unit assemblies, each assembly including at least two fuel cell stack units 35 connected in series and the fuel cell stack unit assemblies being connected in parallel to each other.

The second electrical circuit 95 comprises a second electrical connection interface 155. The second electrical circuit 95 electrically connects the first electrical connection interface 105, the fan 65, the circulator 120 and the heater 75. The second electrical circuit 95 is configured for transmitting a second current C2 between the second electrical connection interface 155, the fan 65, the circulator 120 and the heater 75.

In another embodiment, the second current C2 is transformed, for example in a transformer, to a fourth current C4 configured to drive the fan 65.

The second electrical connection interface 155 is a separable interface. For example, the second electrical connection interface 155 is detachably connected to a corresponding connector of the transformer unit 25. The second electrical connection interface 155 is configured for receiving the second current C2 from the transformer unit 25.

The third electrical circuit 100 comprises a third electrical connection interface 160. The third electrical circuit 100 connects electrically the third electrical connection interface 160, the controller unit 80, all fuel cell stack units 35, the air supply unit 125, the heater 75 and the gaseous hydrogen supply unit 135.

The third electrical circuit 100 is configured for transmitting a third current C3 between the third electrical connection interface 160, the controller unit 80, each fuel cell stack unit 35, the air supply unit 125, the heater 75 and the gaseous hydrogen supply unit 135. The third electrical connection interface 160 is configured for receiving the third current C3 from the transformer unit 25.

The third electrical connection interface 160 is a separable interface. For example, the third electrical connection interface 160 is detachably connected to a corresponding connector of the transformer unit 25. The third electrical connection interface 160 is configured for receiving the third current C3 from the transformer unit 25.

The transformer unit 25 is configured for receiving the first current C1 from the electricity production unit 20, and for generating, from the first current C1, the driving current, a charging electrical current, the second current C2 and the third current C3.

The transformer unit 25 is, for example, configured for transmitting the driving current to the motor 15, for transmitting the charging current to the accumulator 33, for transmitting the second current C2 to the second electrical interface 155 and for transmitting the third current C3 to the third electrical interface 160.

As shown on the left of FIG. 1, the transformer unit 25 comprises for example a first converter 25A and a second converter 25B. The first converter 25A is configured for generating the driving current, suitable for driving the motor 15. The second converter 25B is configured for generating the charging electrical current, the second current C2 and the third current C3.

Each converter 25A, 25B is, for example, secured underneath a floor of vehicle 10.

The charging current is configured for loading the accumulator 33. For example, the charging current is a DC current. The transformer unit 25 imposes a charging voltage between two connectors in order to generate the charging current. The charging voltage is comprised between 680 V and 950 V, preferably between 700 V and 900 V.

The second current C2 is configured for powering the fan 65 or the transformer to create the fourth current C4 for the fan 65, the heater 75 and the circulator 120. The second current C2 is an AC current. For example, the second current C2 is a three-phase current.

The transformer unit 25 imposes a second voltage V2 between two connectors in order to generate the second current C2. The second voltage V2 is different from the first voltage V1. The second voltage V2 is equal to 400 Volt (V).

The third current C3 is configured for supplying power consumers such as controller 80. The third current C3 is a DC current.

The transformer unit 25 imposes a third voltage V3 between two connectors in order to generate the third current C3. The third voltage V3 is different from the first voltage V1. The third voltage V3 is different from the second voltage V2. The third voltage V3 is equal to 24 V.

The fuel storage unit 30 is configured for storing gaseous hydrogen. The hydrogen is stored on a pressure level of 350 bars. In another embodiment the pressure level is 700 bars.

The fuel storage unit 30 is, for example, an assembly of several pressure vessels connected together with pipes and mounted on a frame.

The fuel storage unit 30 is further configured for supplying the gaseous hydrogen supply unit 135 with gaseous hydrogen. The fuel storage unit 30 is connected to the fuel interface 142 and configured to transmit gaseous hydrogen to the gaseous hydrogen supply unit 135 through the fuel interface 142.

The fuel storage unit 30 is secured to the roof of the vehicle 10. The fuel storage unit 30 is, preferably, secured above and supported by the roof of the vehicle 10. For example, the frame of the fuel storage unit 30 is removably mounted on the roof of the vehicle 10.

The electrical accumulator 33 is configured for storing electrical energy. The electrical accumulator 33 is electrically connected to the transformer unit 25.

The electrical accumulator 33 is further configured for generating the driving current and for supplying the motor 15 with the driving current.

In particular, the accumulator 33 is designed to generate the whole driving current for the motor 15 for a short period of time until the electricity production unit 20 has increased its power output. The electrical accumulator 33 comprises, for example, lithium-ion batteries or NiMH or NiCd batteries.

The electrical accumulator is secured underneath a floor of the electric vehicle 10.

The electricity supply system comprises an electricity production unit 20, a transformer unit 25, a fuel storage unit 30 and an electrical accumulator 33.

The fluid circulation circuit 18 is, for example, configured to heat a passenger compartment of the vehicle 10.

The fluid circulation circuit 18 is at least partially filled with a supplementary fluid, such as liquid water.

In this case, the fluid circulation circuit 18 comprises radiators for heating the passenger compartment by transmitting heat from the supplementary fluid to the air inside the passenger compartment. In another embodiment, the fluid circulation circuit 18 further comprises a heater for heating the supplementary fluid.

The fluid circulation circuit 18 is fluidically independent from the cooling circuit 40. More precisely, the fluid circulation circuit 18 and the cooling circuit are configured in such a manner that no fluid is exchanged between the circulation circuit 18 is and the cooling circuit 40 when the vehicle 10 is in use.

Thanks to the invention, if a component of the electricity production unit 20 is faulty, the electricity production unit 20 may be removed from the vehicle 10 and replaced by a functioning electricity production unit 20. The faulty electricity production unit 20 may therefore be repaired while the vehicle 10 remains in operation. The availability of the vehicle 10 is therefore improved.

As the fuel storage unit 30 is separate from the electricity production unit 20, the electricity production unit 20 has reduced dimensions compatible with an easy removal from the vehicle 10.

The electricity production unit 20 may be easily adapted to different uses by simply modifying the number of fuel cell stacks units 35 in the electricity production unit 20 in order to modify the first voltage V1 or the maximal intensity of the first current C1. The power output is therefore easily scalable.

Furthermore, by dissipating excess heat through the radiators of the fluid circulation circuit 18, the total energy consumption of the vehicle 10 is reduced.

The embodiment and variants described here-above can be combined to generate new embodiments of the invention.

The invention claimed is:

1. A vehicle comprising an electricity supply system, the electricity supply system comprising:
   an electricity production unit generating a first voltage configured to cause a first electrical current to flow;
   a transformer unit and a fuel storage unit storing gaseous hydrogen;
   wherein the electricity production unit comprises:
      at least two fuel cell stacks and comprising a single first electrical connection interface configured to transmit the first electrical current to the transformer unit,
      a single common cooling circuit filled with a first fluid cooling each fuel cell stack, and
      a common air supply circuit supplying air to each fuel cell stack and a single common gaseous hydrogen supply circuit supplying gaseous hydrogen, from the fuel storage unit, to each fuel cell stack,
      wherein the electricity production unit is separate from the fuel storage unit and connected to the fuel storage unit by a single connection interface, and
      wherein the electricity production unit being removable from the vehicle as an integrated unit independently from the fuel storage unit,
   wherein the vehicle comprises a fluid circulation circuit filled with a second fluid, the fluid circulation circuit being fluidically independent from the cooling circuit and the electricity production unit comprises a first thermal exchanger exchanging heat between the first fluid and the second fluid, and
   wherein the electricity production unit further comprising a separable interface configured to transmit the second fluid between the first thermal exchanger and the fluid circulation circuit, the separable interface being configured to physically separate the first thermal exchanger from the fluid circulation circuit when removing the electricity production unit from the vehicle.

2. The vehicle according to claim 1, wherein the fluid circulation circuit heats a passenger compartment of the vehicle.

3. The vehicle according to claim 1, wherein the cooling circuit further comprises a second thermal exchanger exchanging heat between the first fluid and air.

4. The vehicle according to claim 1, wherein the electricity production unit comprises a common exhaust circuit collecting exhaust gases of each fuel cell stacks, the exhaust circuit comprising a water condenser extracting liquid water from the exhaust gases.

5. The vehicle according to claim 1, wherein the electricity production unit comprises a single common heater heating all fuel stacks.

6. The vehicle according to claim 1, wherein the transformer unit is configured to generate, from the first current, at least a second voltage different from the first voltage and a third voltage different from the second voltage and the first voltage, the second voltage configured to cause a second current to flow and the third voltage configured to cause a third current to flow, the electricity production unit being removable from the electric vehicle independently from the transformer unit and comprising a second electrical connection interface configured to transmit the second current from the transformer unit to the electricity production unit and a third electrical connection interface configured to transmit the third current from the transformer unit to the electricity production unit.

7. The vehicle according to claim 6, wherein the second current is an AC current driving at least the cooling circuit and the third current is a DC current.

8. The vehicle according to claim 1, wherein the vehicle is an electrical vehicle comprising an electrical motor, the electricity supply system further comprising at least an electrical accumulator generating a driving electrical current for driving the motor, the transformer unit generating, from the first current, a charging electrical current charging the accumulator.

9. The vehicle according to claim 1, wherein the cooling circuit comprises a fluid circulator circulating the first fluid and each fuel cell stack comprises a commuting device electrically connecting the fuel cell stack to the first electrical interface, the production unit further comprising a controller unit controlling the fluid circulator and each commuting device.

10. A vehicle comprising an electricity supply system, the electricity supply system comprising:
    an electricity production unit generating a first voltage configured to cause a first electrical current to flow;
    a transformer unit and a fuel storage unit storing gaseous hydrogen;
    wherein the electricity production unit comprises:
       at least two fuel cell stacks and comprising a single first electrical connection interface configured to transmit the first electrical current to the transformer unit;
       a single common cooling circuit filled with a first fluid cooling each fuel cell stack,
       a common air supply circuit supplying air to each fuel cell stack and a single common gaseous hydrogen supply circuit supplying gaseous hydrogen, from the fuel storage unit, to each fuel cell stack, and
       wherein the electricity production unit is separate from the fuel storage unit and connected to the fuel storage unit by a single connection interface,
       wherein the electricity production unit being removable from the vehicle as an integrated unit independently from the fuel storage unit, and
       wherein when the electricity production unit is removed from the vehicle, a relative movement of each of elements comprised in the electricity production unit with respect to the vehicle is identical and simultaneous to a movement of each other element comprised in the electricity production unit,
    wherein the vehicle comprises a fluid circulation circuit filled with a second fluid, the fluid circulation circuit being fluidically independent from the cooling circuit and the electricity production unit comprises a first thermal exchanger exchanging heat between the first fluid and the second fluid, and
    wherein the electricity production unit further comprising a separable interface configured to transmit the second fluid between the first thermal exchanger and the fluid circulation circuit, the separable interface being configured to physically separate the first thermal exchanger from the fluid circulation circuit when removing the electricity production unit from the vehicle.

11. A vehicle comprising an electricity supply system, the electricity supply system comprising:
    an electricity production unit generating a first voltage configured to cause a first electrical current to flow;
    a transformer unit and a fuel storage unit storing gaseous hydrogen;

wherein the electricity production unit comprises:
  at least two fuel cell stacks and comprising a single first electrical connection interface configured to transmit the first electrical current to the transformer unit;
  a single common cooling circuit filled with a first fluid cooling each fuel cell stack,
  a common air supply circuit supplying air to each fuel cell stack and a single common gaseous hydrogen supply circuit supplying gaseous hydrogen, from the fuel storage unit, to each fuel cell stack, and
  wherein the electricity production unit is separate from the fuel storage unit and connected to the fuel storage unit by a single connection interface,
  wherein the electricity production unit being removable from the vehicle as an integrated unit independently from the fuel storage unit,
wherein the vehicle comprises a fluid circulation circuit filled with a second fluid, the fluid circulation circuit being fluidically independent from the cooling circuit and the electricity production unit comprises a first thermal exchanger exchanging heat between the first fluid and the second fluid, wherein the electricity production unit further comprising a separable interface configured to transmit the second fluid between the first thermal exchanger and the fluid circulation circuit, the separable interface being configured to physically separate the first thermal exchanger from the fluid circulation circuit when removing the electricity production unit from the vehicle, wherein the transformer unit generates, from the first current, at least a second voltage different from the first voltage and a third voltage different from the second voltage and the first voltage, the second voltage configured to cause a second current to flow and the third voltage configured to cause a third current to flow, the electricity production unit being removable from the electric vehicle independently from the transformer unit and comprising a second electrical connection interface configured to transmit the second current from the transformer unit to the electricity production unit and a third electrical connection interface configured to transmit the third current from the transformer unit to the electricity production unit.

\* \* \* \* \*